US012566832B2

(12) United States Patent
Rajampet et al.

(10) Patent No.: US 12,566,832 B2
(45) Date of Patent: Mar. 3, 2026

(54) SYSTEMS AND METHODS FOR OPTICAL SIGNATURE GENERATION AND AUTHENTICATION

(71) Applicant: Verizon Patent and Licensing Inc., Basking Ridge, NJ (US)

(72) Inventors: Shreya Nanda Rajampet, Hyderabad (IN); Viraj Chandrakant Mantri, Mumbai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 231 days.

(21) Appl. No.: 18/313,438

(22) Filed: May 8, 2023

(65) Prior Publication Data

US 2024/0378272 A1    Nov. 14, 2024

(51) Int. Cl.

| | |
|---|---|
| *G06F 21/32* | (2013.01) |
| *G06F 3/01* | (2006.01) |
| *G06T 7/246* | (2017.01) |
| *G06T 7/73* | (2017.01) |
| *G06V 40/18* | (2022.01) |
| *G06V 40/50* | (2022.01) |

(52) U.S. Cl.
CPC .............. *G06F 21/32* (2013.01); *G06F 3/013* (2013.01); *G06T 7/248* (2017.01); *G06T 7/74* (2017.01); *G06V 40/197* (2022.01); *G06V 40/50* (2022.01); *G06T 2200/24* (2013.01)

(58) Field of Classification Search
CPC ......... G06F 21/32; G06F 3/013; G06T 7/248; G06T 2200/24; G06V 40/197; G06V 40/50
See application file for complete search history.

(56) References Cited

U.S. PATENT DOCUMENTS

| | | | | |
|---|---|---|---|---|
| 11,496,458 | B1 * | 11/2022 | Anand | .................. H04L 67/141 |
| 12,353,616 | B2 * | 7/2025 | Hajimirza | ............... G06F 3/013 |
| 2008/0104415 | A1 * | 5/2008 | Palti-Wasserman | ......................... |
| | | | | G06V 40/197 |
| | | | | 382/117 |
| 2022/0292749 | A1 * | 9/2022 | Brooks | .................. B60K 35/80 |
| 2023/0169157 | A1 * | 6/2023 | Grover | ................ G06V 40/168 |
| | | | | 726/26 |
| 2024/0165518 | A1 * | 5/2024 | Farber | .................. G06V 40/174 |
| 2024/0345656 | A1 * | 10/2024 | Beavers | ................. G06F 3/013 |

* cited by examiner

*Primary Examiner* — Lynn D Feild
*Assistant Examiner* — Vladimir I Gavrilenko

(57) ABSTRACT

In some implementations, a device may track a gaze of a user. The device may detect a direction of the gaze of the user. The device may detect eye movement data associated with one or more changes in the direction of the gaze of the user. The device may translate the eye movement data associated with the one or more changes in the direction of the gaze of the user into a gaze signature. The gaze signature may include a set of reference points corresponding to positions of the direction of the gaze of the user in a coordinate system associated with an interface of the device. The device may register the gaze signature as an authentication credential associated with the user.

20 Claims, 7 Drawing Sheets

200

Server Device 205

Network 210

User Device 105

300

Bus
310

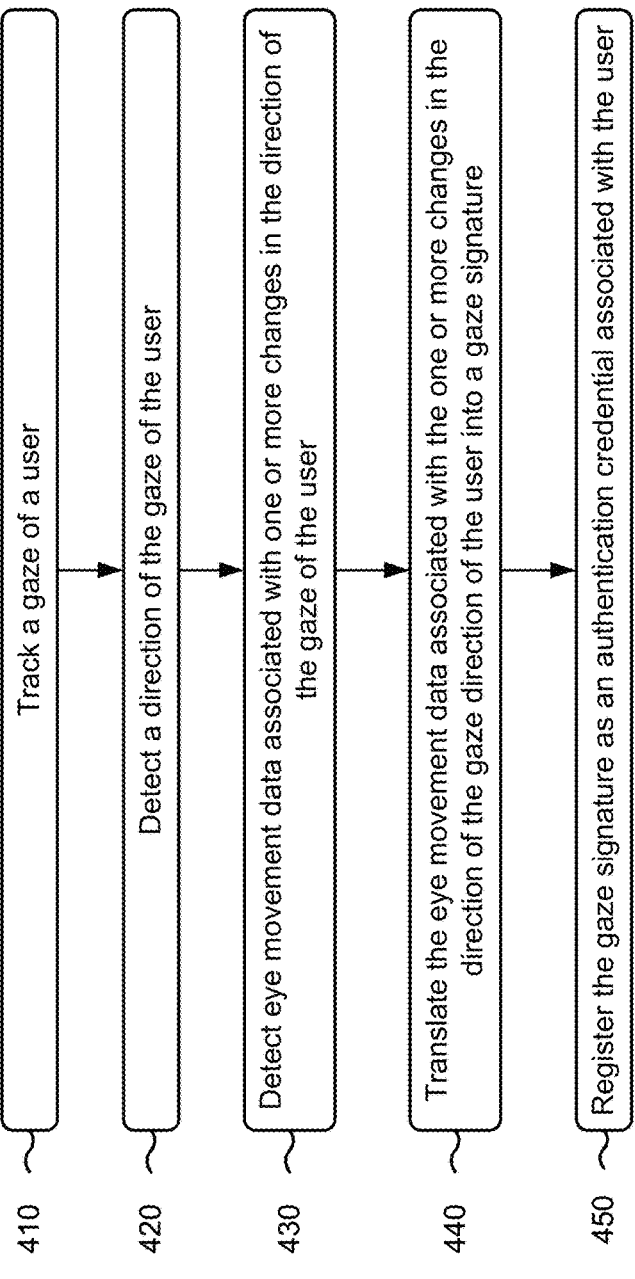

400

410 Track a gaze of a user

420 Detect a direction of the gaze of the user

430 Detect eye movement data associated with one or more changes in the direction of the gaze of the user 440 Translate the eye movement data associated with the one or more changes in the direction of the gaze direction of the user into a gaze signature 450 Register the gaze signature as an authentication credential associated with the user

FIG. 4

SYSTEMS AND METHODS FOR OPTICAL SIGNATURE GENERATION AND AUTHENTICATION

BACKGROUND

An authentication system may use one or more authentication techniques to authenticate a user. Typically, to authenticate the user, the authentication system receives, from a user device of the user, a user input indicating one or more authentication credentials associated with the user, such as a username and a password associated with the user. The authentication system compares the one or more authentication credentials to stored authentication credential information associated with the user, such as a stored username and a stored password associated with the user. The authentication system authenticates the user based on determining that the one or more authentication credentials match the stored authentication credential information.

BRIEF DESCRIPTION OF THE DRAWINGS

FIG. 4 is a flowchart of an embodiment of a process associated with optical signature generation and authentication.

DETAILED DESCRIPTION OF EXAMPLE EMBODIMENTS

Figure 1A:
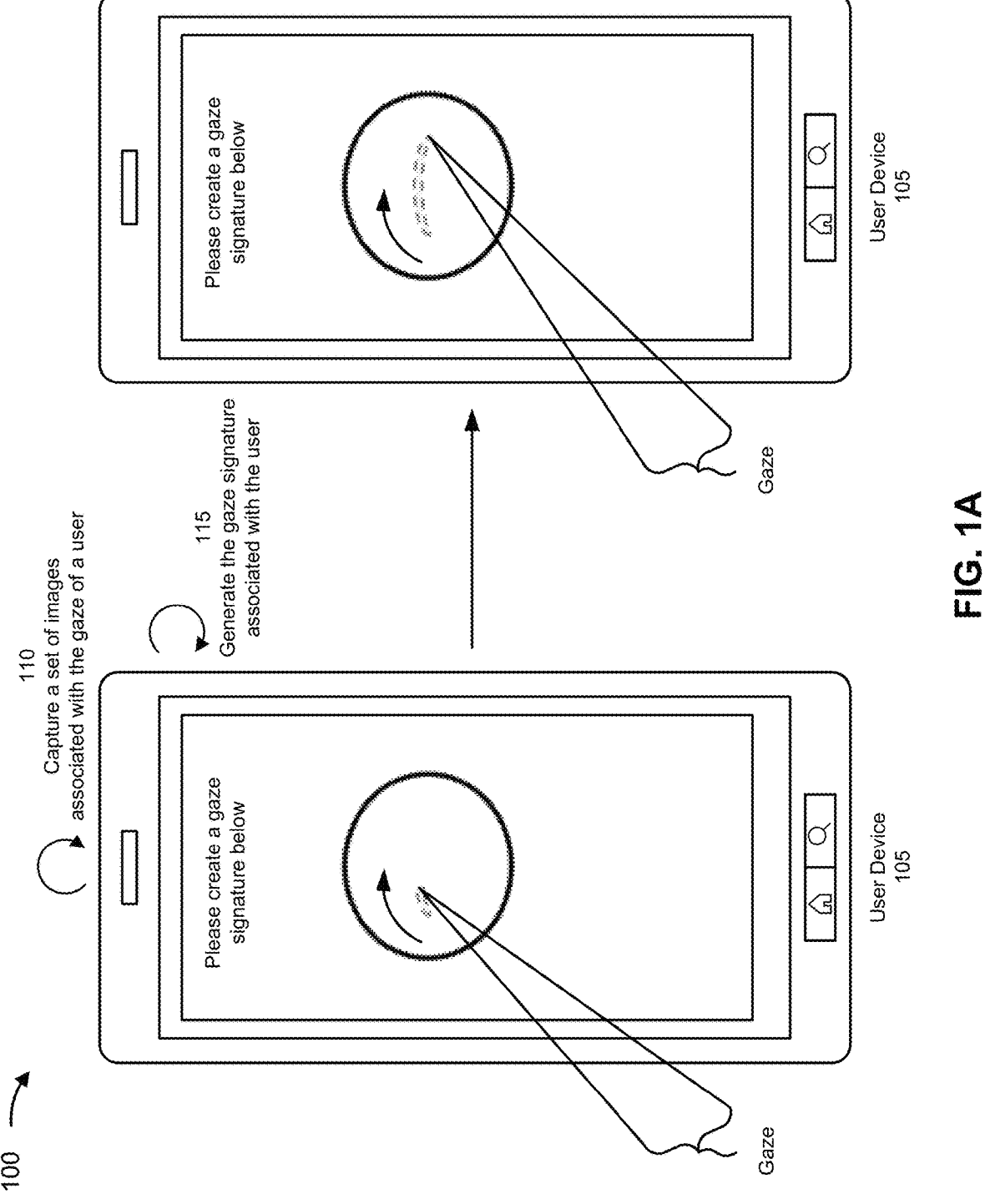
FIGS. 1A-1D are diagrams of an example embodiment associated with optical signature generation and authentication.

The following detailed description of example implementations refers to the accompanying drawings. The same reference numbers in different drawings may identify the same or similar elements.

An authentication system may use one or more authentication techniques to authenticate a user (e.g., verify an identity of the user). For example, to authenticate the user, the authentication system may receive, and a user device of the user may provide, an indication of one or more authentication credentials associated with the user (e.g., a password, a passcode, a one-time pin, and/or biometric data associated with the user, among other examples). The authentication system may compare the one or more authentication credentials to stored authentication credential information associated with the user (e.g., a stored password, a stored passcode, a stored pin, and/or stored biometric data associated with the user, among other examples). The authentication system may authenticate the user based on determining that the one or more authentication credentials match, or sufficiently match, the stored authentication credential information.

In some cases, the authentication system may use the one or more authentication techniques to authenticate the user to provide and/or maintain security associated with accessing the user device of the user. For example, to ensure that only an authorized user can access the user device, the authentication system may use the one or more authentication techniques to authenticate the user before granting the user access to the user device. However, in some cases, a malicious actor may obtain (e.g., in an unauthorized manner) the one or more authentication credentials. For example, the malicious actor may view the user interface when the user is providing the one or more authentication credentials as a user input via the user device. The malicious actor may use the one or more authentication credentials to access the user device and/or information stored and/or accessible by the user device in an unauthorized manner.

Furthermore, after a legitimate user accesses the user device (e.g., based on the authentication system authenticating the user and granting the user access to the user device), the user may perform an action that causes the user device to display, via the user interface of the user device, sensitive information (e.g., personal information, confidential information, private information, banking information, emails, images, texts, and/or videos, among other examples). If the user is in a public area (e.g., a public library, a bus, a train, and/or a stadium, among other examples), then surrounding persons (e.g., shoulder surfers) may be able to view the sensitive information that is displayed via the user interface of the user device. This leads to an increased risk associated with a malicious actor obtaining the sensitive information and/or using the sensitive information in an unauthorized manner. Additionally, this creates privacy concerns because the surrounding persons may be able to view the sensitive information (e.g., private images and/or private emails associated with the user).

Some implementations described herein enable optical signature generation and authentication. For example, a device may obtain (e.g., using one or more computer vision techniques) data associated with a gaze of the user and/or may process (e.g., using the one or more computer vision techniques) the data associated with the gaze of the user to generate the optical signature, which is also referred to herein as a gaze signature. For example, the device may track a gaze of a user. The device may detect a direction of the gaze of the user. The device may detect eye movement data associated with one or more changes in the direction of the gaze of the user. The device may translate the eye movement data associated with the one or more changes in the direction of the gaze of the user into the gaze signature.

In some implementations, the gaze signature may include reference points (e.g., a set of reference points) corresponding to positions of the direction of the gaze of the user in a coordinate system associated with an interface of the device. In some implementations, the device may display, via an interface of the device, information that indicates the gaze signature. As an example, the information that indicates the gaze signature may visually depict a motion pattern associated with the gaze signature based on the reference points (e.g., the device may generate the motion pattern associated with the gaze signature as the device generates the reference points to be displayed via the user interface), as described in more detail elsewhere herein.

In some implementations, the device may register the gaze signature as an authentication credential. For example, the device may store the reference points that correspond to the positions of the direction of the gaze of the user and/or the information that indicates the gaze signature (e.g., the information that enables the device to visually depict the motion pattern associated with the gaze signature). In some implementations, the device may detect a trigger event associated with an authentication request. The device may detect, based on detecting the trigger event, a focus point of the gaze of the user in the coordinate system associated with the interface of the device. The device may detect eye movement data associated with one or more changes in the focus point of the gaze of the user. The device may translate the eye movement data associated with the one or more changes in the focus point of the gaze of the user into a focus point signature.

In some implementations, the focus point signature may include reference focus points (e.g., a set of reference focus points) corresponding to positions of the direction of the focus point of the gaze of the user in the coordinate system associated with the interface of the device. The device may compare the focus point signature and the gaze signature to determine whether a measure of similarity between the focus point signature and the gaze signature satisfies a threshold. The device may authenticate the authentication request based on determining that the measure of similarity between the focus point signature and the gaze signature satisfies the threshold.

In some implementations, the device may perform an action based on authenticating the authentication request. For example, the device may perform a concealing action (e.g., a masking action) that conceals (e.g., that masks) at least a portion of a visual depiction of an object that is displayed via the interface of the device. As another example, the device may perform a revealing action (e.g., an unmasking action) that reveals (e.g., that unmasks) at least a portion of the visual depiction of the object that is displayed via the interface of the device. In this way, the device may perform the concealing action to conceal information (e.g., sensitive information) associated with the visual depiction of the object and/or may perform the revealing action to reveal information associated with the visual depiction of the object.

Furthermore, in some implementations, the device may obfuscate the gaze signature to generate an obfuscated gaze signature (e.g., that includes altered reference points that correspond to altered positions of the direction of the gaze of the user in the coordinate system associated with the user interface) and/or may obfuscate the focus point signature to generate an obfuscated focus point signature (e.g., that includes altered reference focus points that correspond to altered positions of the focus point of the gaze of the user). In some implementations, the device may display information that indicates the obfuscated gaze signature via the user interface of the device and/or information that indicates the obfuscated focus point signature.

In this way, the device may provide the information that indicates the motion pattern associated with the obfuscated gaze signature and/or the information that indicates the motion pattern associated with the obfuscated focus point signature for display via the interface of the device rather than providing information that indicates the motion pattern associated with the gaze signature and/or the information that indicates the motion pattern associated with the focus point signature for display via the interface of the device. As a result, because the interface of the device displays the motion pattern associated with the obfuscated gaze signature and/or the motion pattern associated with the obfuscated focus point signature rather than the motion pattern associated with the gaze signature and/or the motion pattern associated with the focus point signature, only the user knows the motion pattern associated with the gaze signature and/or the motion pattern associated with the focus point signature (e.g., even if the user is in a public place where surrounding persons can view the interface of the device). This enhances security and/or privacy associated with using the gaze signature in an authentication procedure associated with authenticating the user.

In this way, some implementations described herein enable optical signature generation and authentication that provides enhanced security associated with performing an authentication procedure, such as an authentication procedure associated with authenticating a user attempting to gain access to the device. For example, because the device displays the obfuscated gaze signature and/or the obfuscated focus point signature via the interface of the device, a malicious actor that views the interface is unable to determine a motion pattern associated with the gaze signature and/or the motion pattern associated with the focus point signature (e.g., which are used for authenticating the user). Additionally, sensitive information may remain secure even if surrounding persons can view the interface of the device (e.g., because the user can cause the device to conceal the sensitive information based on the user input that is captured by the device).

FIGS. 1A-1D are diagrams of an example 100 associated with optical signature generation and authentication. As shown in FIGS. 1A-1D, example 100 includes a user device 105. Furthermore, in some implementations, example 100 may include a server device (not explicitly shown in FIGS. 1A-1D), as described in more detail elsewhere herein.

As shown in FIG. 1A, a user of the user device 105 may utilize the user device 105 to create a gaze signature (e.g., the user device 105 may generate the gaze signature based on tracking eye movements of the user, as described in more detail elsewhere herein). A gaze signature (e.g., generated by the user device 105) may include reference points (e.g., a set of reference points) indicating positions of a direction of a gaze of the user in a coordinate system associated with a user interface of the user device 105, as described in more detail elsewhere herein.

In some implementations, information that indicates the gaze signature may be displayed via a user interface of the device. As an example, the information that indicates the gaze signature may visually depict a motion pattern associated with the gaze signature based on the reference points (e.g., the user device 105 may generate the motion pattern associated with the gaze signature as the user device 105 generates the reference points to be displayed via the user interface), as described in more detail elsewhere herein. The gaze signature (e.g., the motion pattern associated with the gaze signature) may be registered as an authentication credential associated with the user. The authentication credential may be stored and may be used for authenticating the user (e.g., in association with an authentication request), as described in more detail elsewhere herein.

As further shown in FIG. 1A, and by reference number 110, the user may utilize the user device 105 to capture a set of images associated with the gaze of the user. For example, the user of the user device 105 may align a field of view (FOV) of a camera of the user device 105 with a face of the user (e.g., to enable eyes of the user to be included in the FOV of the camera). The user may utilize the user device 105 to capture the set of images of the eyes of the user. Each image, of the set of images, may include one or more features associated with the eyes of the user. As an example, the one or more features associated with the eyes of the user may include pupil positions, pupil sizes, corneal reflections, eye movements, and/or eyelid positions, among other examples.

In some implementations, the user device 105 may process images, of the set of images, to obtain eye data associated with the eyes of the user. As an example, the user device 105 may process the images, of the set of images, using one or more computer vision techniques image to obtain pupil position data (e.g., associated with indicating pupil position measurements of the eyes of the user), pupil size data (e.g., associated with indicating pupil size measurements of the eyes of the user), corneal reflection data (e.g. associated with indicating corneal reflection measurements of the eyes of the user), eye movement data (e.g., associated with indicating eye movement measurements of the eyes of the user), and/or eyelid position data (e.g., associated with indicating eyelid position measurements of the of eyelids of the user), among other examples.

In some implementations, the user device 105 may perform one or more operations based on the eye data associated with the eyes of the user (e.g., based on the pupil position data, the pupil size data, the corneal reflection data, the eye movement data, and/or the eye lid position data, among other examples). For example, the user device 105 may detect and/or track the gaze of the user, may detect and/or track a direction of the gaze of the user, and/or may translate changes in the direction of the gaze of the user into reference points that correspond to positions of the direction of the gaze user (e.g., in a coordinate system associated with the user interface), as described in more detail elsewhere herein. As another example, the user device 105 may detect and/or track a focus point of the gaze of the user and/or may translate changes in a position of the focus point of the gaze of the user into focus point reference points that correspond to positions of the focus point of the gaze of the user in the coordinate system associated with the user interface, as described in more detail elsewhere herein.

As shown by reference number 115, the user device 105 may generate a gaze signature associated with the user. In some implementations, the user device 105 may generate the gaze signature by translating eye movement data (e.g., associated with indicating one or more changes in the direction of the gaze of the user) into the reference points that correspond to the positions of the direction of the gaze of the user in the coordinate system associated with the user interface. For example, the user device 105 may translate the eye movement data into two-dimensional (2D) reference points that correspond to positions of the direction of the gaze of the user in a 2D extended reality coordinate system (e.g., 2D coordinates that correspond to positions of the direction of the gaze of the user along two perpendicular axes of the extended reality coordinate system) associated with the user interface of the user device 105.

As another example, the user device 105 may translate the eye movement data into three-dimensional (3D) reference points that correspond to positions of the direction of the gaze of the user in a 3D extended reality coordinate system (e.g., 3D coordinates that correspond to positions of the direction of the gaze of the user along three perpendicular axes of the 3D extended reality system) associated with the user interface of the user device 105. Thus, for example, the reference points may correspond to positions of the direction of the gaze of the gaze of the user in an augmented or mixed reality coordinate system (e.g., associated with an augmented or mixed reality environment) associated with the user interface of the user device 105. In this way, the user device 105 may use the reference points to visually depict the positions of the direction of the gaze of the user (e.g., via the user interface of the user device 105), as described in more detail elsewhere herein.

In some implementations, the reference points that correspond to the positions of the direction of the gaze of the user may be associated with anchor points (e.g., 2D or 3D anchor points) that are associated with an extended reality coordinate system. For example, an anchor point may be a fixed location in the extended reality environment that serves as a reference point for overlaying digital content onto a visual depiction or representation of an object (e.g., a real-world object in a real-world environment via an extended reality application executing on the user device 105).

As an example, a 2D anchor point may be a fiducial marker (e.g., a printed quick response (QR) code) on a surface (e.g., a flat surface). When the fiducial marker is viewed (e.g., via the user interface of the user device 105), the user device 105 may track the fiducial marker to a determine position and/or an orientation associated with the surface. The user device 105 may overlay digital content on the surface (e.g., a document object model (DOM) element, a JavaScript Object Notation (JSON) element, an image, text, and/or an animation, among other examples). In this way, the overlaid digital content may appear to be a part of the real world. As another example, a 3D anchor point may be associated with a physical object and/or a fixed location (e.g., associated with the 3D environment). For example, the 3D anchor point may be used to register and/or align digital content with the physical object and/or the fixed location in the 3D environment. In this way, the registered and/or the aligned digital content may appear to be a part of the real world.

In some implementations, the user device 105 may display information that indicates the gaze signature via the user interface of the user device 105. As an example, the user device 105 may display information that visually depicts a motion pattern associated with the gaze signature based on the reference points (e.g., the user device 105 may generate the motion pattern associated with the gaze signature as the user device 105 generates the reference points to be displayed via the user interface). For example, the user device 105 may indicate, via the user interface of the user device 105, a visual depiction of the reference points (e.g., successive reference points and/or successive anchor points, among other examples) being connected to one another (e.g., via a line or a curve) on the user interface of the user device 105 (e.g., in real time as the user device 105 translates the eye movement data into the reference points).

As an example, if the reference points include a sequence of a first reference point that corresponds to a first position in a 2D coordinate system indicated as (0,0), a second reference point that corresponds to a second position in the 2D coordinate system indicated as (1,0), a third reference point that corresponds to a third position in the 2D coordinate system indicated as (1,1), and a fourth reference point that corresponds to a fourth position in the 2D coordinate system indicated as (0,1), then the user device 105 may display information that visually depicts a square being generated via the user interface (e.g., the user device 105 may display, via the user interface, the first position being connected to the second position, the second position being connected to the third position, and the third position being connected to the fourth position to form the square). In this way, the user of the user device 105 may view the motion pattern associated with the gaze signature (e.g., which is displayed via the user interface) as the gaze signature is being generated, which may appear to the user that the user is drawing the motion pattern associated with the gaze signature (e.g., based on eye movements of the user).

In some implementations, the user device 105 may obfuscate the gaze signature to generate an obfuscated gaze signature. For example, to generate the obfuscated gaze signature, the user device 105 may alter the reference points that correspond to the positions of the direction of the gaze of the user in the coordinate system associated with the user interface to generate altered reference points that correspond to altered positions of the direction of the gaze of the user in the coordinate system associated with the user interface.

As an example, the user device 105 may alter values of the reference points to generate altered values of the reference points. For example, the user device 105 may use offset values to alter the values of the reference points (e.g., the offset values may be subtracted from the values of the reference points or added to the values of the reference points) to generate the altered reference points. As another example, the user device 105 may use angle rotation values to alter the values of the reference points (e.g., the values of the reference points may be rotated by angles associated with the angle rotation values) to generate the altered reference points. Although the user device 105 is described as altering the values of the reference points using offset values and/or angle rotation values, the user device 105 may alter the reference point values in any suitable manner.

In some implementations, the user device 105 may display information that indicates the obfuscated gaze signature via the user interface of the user device 105. As an example, the user device 105 may display information that visually depicts a motion pattern associated with the obfuscated gaze signature based on the altered reference points (e.g., the user device 105 may generate the motion pattern associated with the obfuscated gaze signature as the user device 105 generates the altered reference points to be displayed via the user interface). For example, to generate the motion pattern associated with the obfuscated gaze signature, the user device 105 may indicate, via the user interface of the user device 105, a visual depiction of the altered reference points (e.g., successive altered reference points and/or successive anchor points, among other examples) being connected to one another (e.g., via a line or a curve) on the user interface of the user device 105 (e.g., in real time as the user device 105 translates the eye movement data into the reference points and alters the reference points to generate the altered reference points).

In this way, the user device 105 may provide the information that indicates the motion pattern associated with the obfuscated gaze signature for display via the user interface of the user device 105 rather than providing information that indicates the motion pattern associated with the gaze signature for display via the user interface of the user device 105. For example, if the user's eye gaze moves in a motion pattern that generates a visual depiction of a square pattern, then the user device 105 may display, via the user interface, a motion pattern that generates a visual depiction of an apple pattern rather than the visual depiction of the square pattern. As a result, because the user interface displays the motion pattern associated with the obfuscated gaze signature rather than the motion pattern associated with the gaze signature, only the user knows the motion pattern associated with the gaze signature (e.g., even if the user is in a public place where surrounding persons can view the user interface of the user device 105), which enhances security and/or privacy associated with the gaze signature (e.g., if the gaze signature is used for authentication, as described in more detail elsewhere herein).

In some implementations, the user device 105 may use one or more extended reality techniques (e.g., one or more augmented reality or mixed reality techniques) as a security layer which is used for generating the obfuscated gaze signature. For example, the user device 105 may use the one or more extended reality techniques to generate the obfuscated gaze signature in the extended reality environment.

Figure 1B:
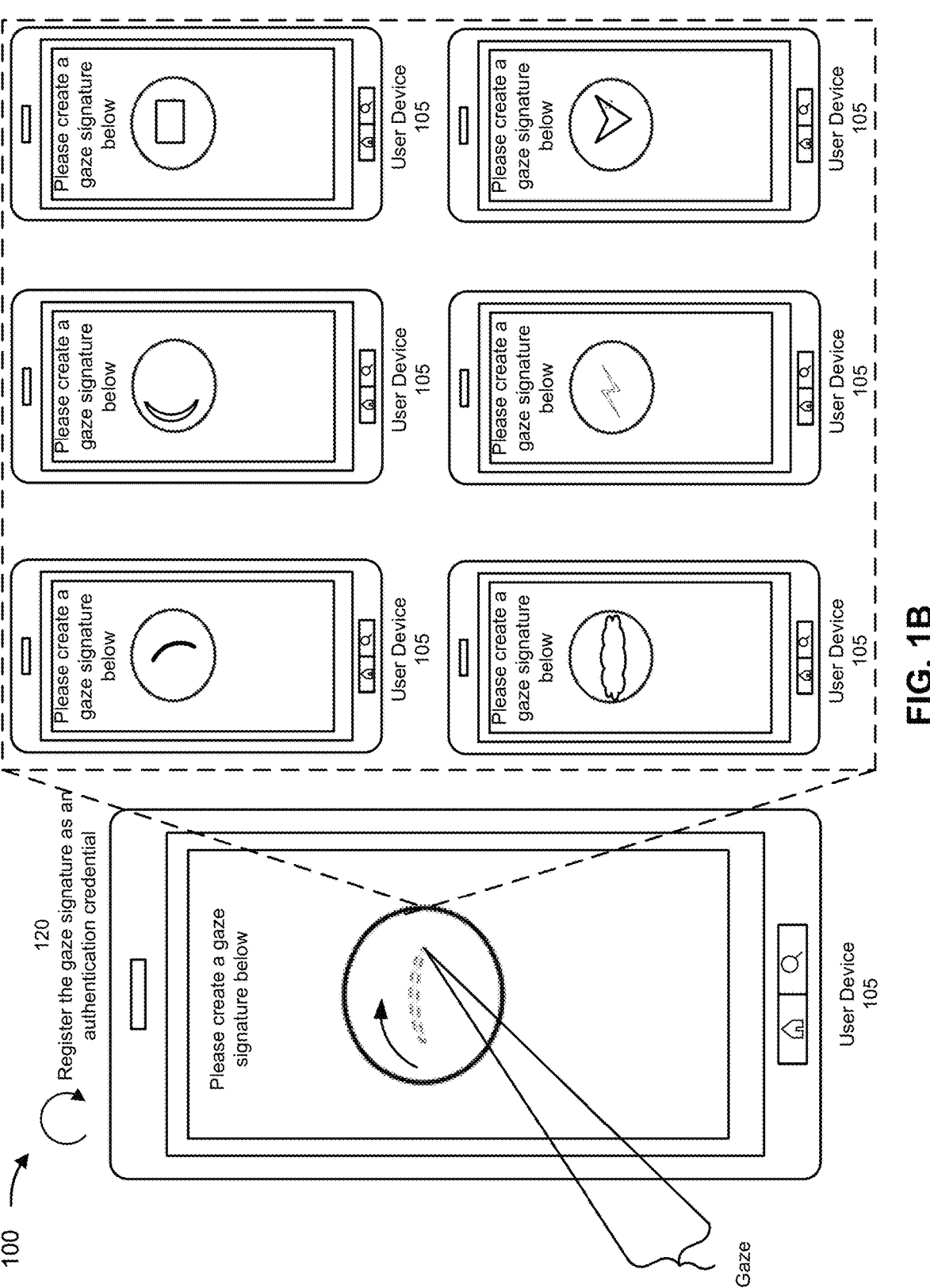

As shown in FIG. 1B, and by reference number 120, the user device 105 may register the gaze signature as an authentication credential (e.g., associated with the user). In some implementations, to register the gaze signature as the authentication credential, the user device 105 may register the motion pattern associated with the gaze signature as the authentication credential. As an example, the user device 105 may store the information that visually depicts the motion pattern associated with the gaze signature via the user interface of the user device 105 (e.g., based on the reference points). In some implementations, the user device 105 may register multiple gaze signatures associated with multiple shapes (e.g., multiple different shapes). As shown in FIG. 1B, for example, the user device 105 may register multiple gaze signatures that depict multiple shapes. In this way, the user can choose any unique shape or pattern that can be created (e.g., by the user device 105) by tracking eye movements of the user.

In some implementations, the user device 105 may identify an initial reference point, included in the reference points, which corresponds to an initial position of the direction of the gaze of the user in the coordinate system associated with the interface of the device. The user device 105 may register, beginning with the initial reference point, the reference points corresponding to the positions of the direction of the gaze of the user in the coordinate system associated with the interface of the device, which enables the user device 105 to define the information that visually depicts the motion pattern associated with the gaze signature.

As an example, if the reference points include a set of reference points that form a square a first reference point that corresponds to a first position in a 2D coordinate system indicated as (0,0), a second reference point that corresponds to a second position in the 2D coordinate system indicated as (1,0), a third reference point that corresponds to a third position in the 2D coordinate system indicated as (1,1), and a fourth reference point that corresponds to a fourth position in the 2D coordinate system indicated as (0,1), then the user device 105 may identify the second reference point as the initial reference point and display information that visually depicts a square being generated via the user interface beginning at the second position (e.g., (0,1)) (e.g., the user device 105 may display, via the user interface, the second position (e.g., (0,1)) being connected to the third position (e.g., (1,1)), the third position (e.g., (1,1)) being connected to the fourth position (e.g., (0,1)), and the fourth position (e.g., (0,1)) being connected to the first position (e.g., (0,0)) to form the square). In this way, the user device 105 may more granularly define the information that visually depicts the motion pattern associated with the gaze signature.

Figure 1C:
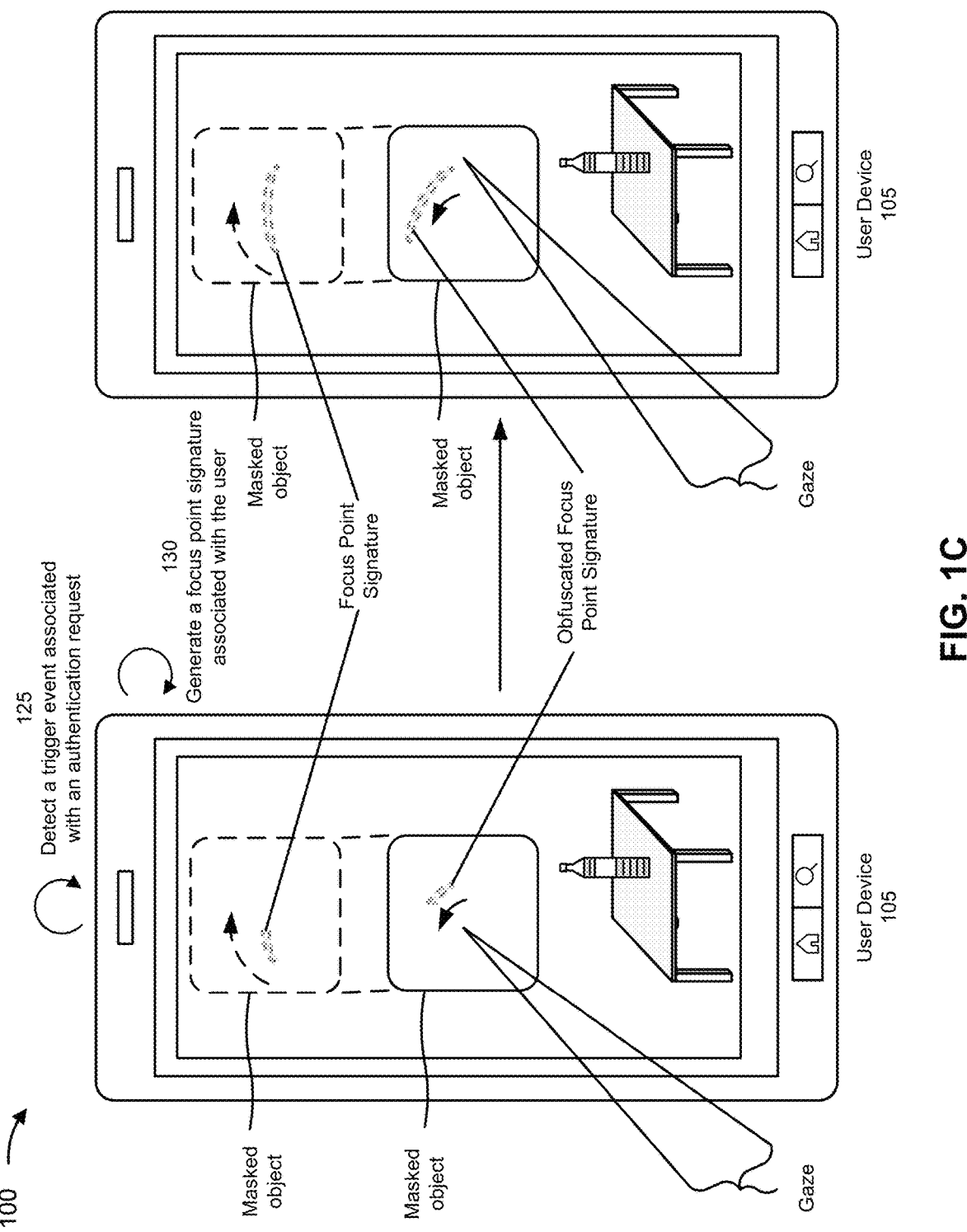

As shown by FIG. 1C, and by reference number 125, the user device 105 may detect a trigger event associated with the authentication request. In some implementations, the trigger event associated with the authentication request may be associated with the user device 105 determining that the position of the direction of the gaze of the user (e.g., in the coordinate system associated with the user interface) intersects with a position (e.g., in the coordinate system associated with the user interface) associated with a visual depiction of a real-world object (e.g., a DOM element and/or a JSON element, among other examples) that is displayed via the user interface.

In some implementations, the visual depiction of the real-world object may be a visual depiction of a masked real-world object (e.g., shown as "Masked object in FIG. 1C). For example, a visual depiction of a masked real-world object may be a visual depiction of a real-world object that has a surface that is concealed by a concealer (e.g., a cover and/or a layer, among other examples). Thus, for example, if the surface of the masked real-world object displays information, then the information is not visible via the user interface (e.g., because the concealer conceals the surface). In some implementations, the concealer may be removed to visually depict an unmasked real-world object. For example, if the surface of the masked-real world object displays information, then the user device 105 may remove (e.g., based on authenticating the authentication request) the concealer to reveal the surface that displays the information (e.g., to enable the information to be visible via the user interface), as described in more detail elsewhere herein.

For example, if the visual depiction of the real-world object that is displayed via the user interface is a visual depiction of a 3D real-world object that is displayed (e.g., by the user interface) in a 3D extended reality environment, then the position associated with the visual depiction of the 3D real-world object may be associated with a size and/or a shape of the visual depiction of the 3D real-world object that is displayed in the 3D extended reality environment. As an example, if the visual depiction of the 3D real-world object is a 3D cuboid, then the position associated with the visual depiction of the 3D cuboid may be associated with a size indicated by positions along three axes of the 3D extended reality coordinate system (e.g., x, y, and z coordinates along perpendicular x, y, and z axes) and/or a shape indicated by dimensions of the 3D cuboid along the three axes of the 3D extended reality coordinate system (e.g., a height coordinate, a width coordinate, and a depth coordinate along the x, y, and z axes).

For example, to determine whether the position of the direction of the gaze of the user intersects with the position associated with the visual depiction of the 3D real-world object, the user device 105 may determine whether the position of the direction of the gaze of the user intersects with a surface associated with the 3D real-world object (e.g., defined by the size and shape coordinates of the visual depiction of the 3D real-world object). Thus, in some implementations, the user device 105 may determine that the position of the direction of the gaze of the user intersects with the position associated with the visual depiction of the 3D real-world object based on determining that coordinates that correspond to the position of the direction of the gaze of the user intersect with coordinates that correspond to the size and/or shape of the visual depiction of the 3D real-world object.

As further shown in FIG. 1C, and by reference number 130, the user device 105 may generate a focus point signature associated with the user. For example, the user device 105 may generate the focus point signature associated with the user based on detecting the trigger event associated with the authentication request. In some implementations, the user device 105 may generate the focus point signature associated with the user in a similar manner that the user device 105 generates the gaze signature associated with the user (e.g., as described in connection with FIG. 1A and reference number 115 and/or as described in more detail elsewhere herein).

As an example, the user device 105 may use one or more computer vision techniques to detect and/or track the gaze of the user, to detect and/or track a focus point of the gaze of the user (e.g., a position of the focus point of the gaze of the user) and/or to translate changes in a position of the focus point of the gaze of the user into reference focus points (e.g., a set of reference focus points) that correspond to positions of the focus point of the gaze of the user (e.g., in a coordinate system associated with the user interface), as described in more detail elsewhere herein.

In some implementations, the user device 105 may display information that indicates the focus point signature via the user interface of the user device 105 (e.g., in a similar manner that the user device 105 displays the information that indicates the gaze signature via the user interface of the user device 105, as described in connection with FIG. 1A and reference number 115, and/or as described in more detail elsewhere herein). For example, the user device 105 may display information that visually depicts a motion pattern associated with the focus point signature based on the reference focus points (e.g., the user device 105 may generate the motion pattern associated with the gaze signature as the user device 105 generates the reference focus points to be displayed via the user interface).

In some implementations, to display the visual depiction of the motion pattern associated with the focus point signature via the user interface, the user device 105 may overlay the visual depiction of the motion pattern associated with the focus point signature on a surface of the visual depiction of the real-world object. As an example, the user device 105 may cause the visual depiction of the motion pattern to begin at a position associated with a focus point that corresponds to a position that intersects with a position associated with a visual depiction of the real-world object. In this way, the user of the user device 105 may view the motion pattern associated with the focus point signature (e.g., as the motion pattern is being overlaid over the surface of the visual depiction of the real-world object) as the focus point signature is being generated, which may appear to the user that the user is drawing the motion pattern associated with the focus signature (e.g., based on eye movements of the user).

In some implementations, the user device 105 may obfuscate the focus point signature to generate an obfuscated focus point signature (e.g., in a similar manner that the user device 105 obfuscates the gaze signature to generate the obfuscated gaze signature, as described in connection with FIG. 1A and reference number 115, and/or as described in more detail elsewhere herein). In some implementations, the user device 105 may display information that indicates the obfuscated focus point signature (e.g., in a similar manner that the user device 105 displays the information that indicates the obfuscated gaze signature, as described in connection with FIG. 1A and reference number 115, and/or as described in more detail elsewhere herein).

In this way, the user device 105 may provide information that indicates the motion pattern associated with the obfuscated focus point signature for display via the user interface of the user device 105 rather than providing information that indicates the motion pattern associated with the focus point signature for display via the user interface of the user device 105. As a result, because the user interface displays the motion pattern associated with the obfuscated focus point signature rather than the motion pattern associated with the focus point signature (e.g., as shown in FIG. 1C, the visual depiction of the motion pattern associated with the obfuscated focus point signature is visible to the user and the motion pattern associated with the focus point signature is not visible to the user), only the user knows the motion pattern associated with the focus point signature (e.g., even if the user is in a public place where surrounding persons can view the user interface of the user device 105). In some implementations, the authentication procedure associated with the authentication request may include comparing the gaze signature and the focus signature to determine whether to authenticate the authentication request, as described in more detail elsewhere herein.

Figure 1D:
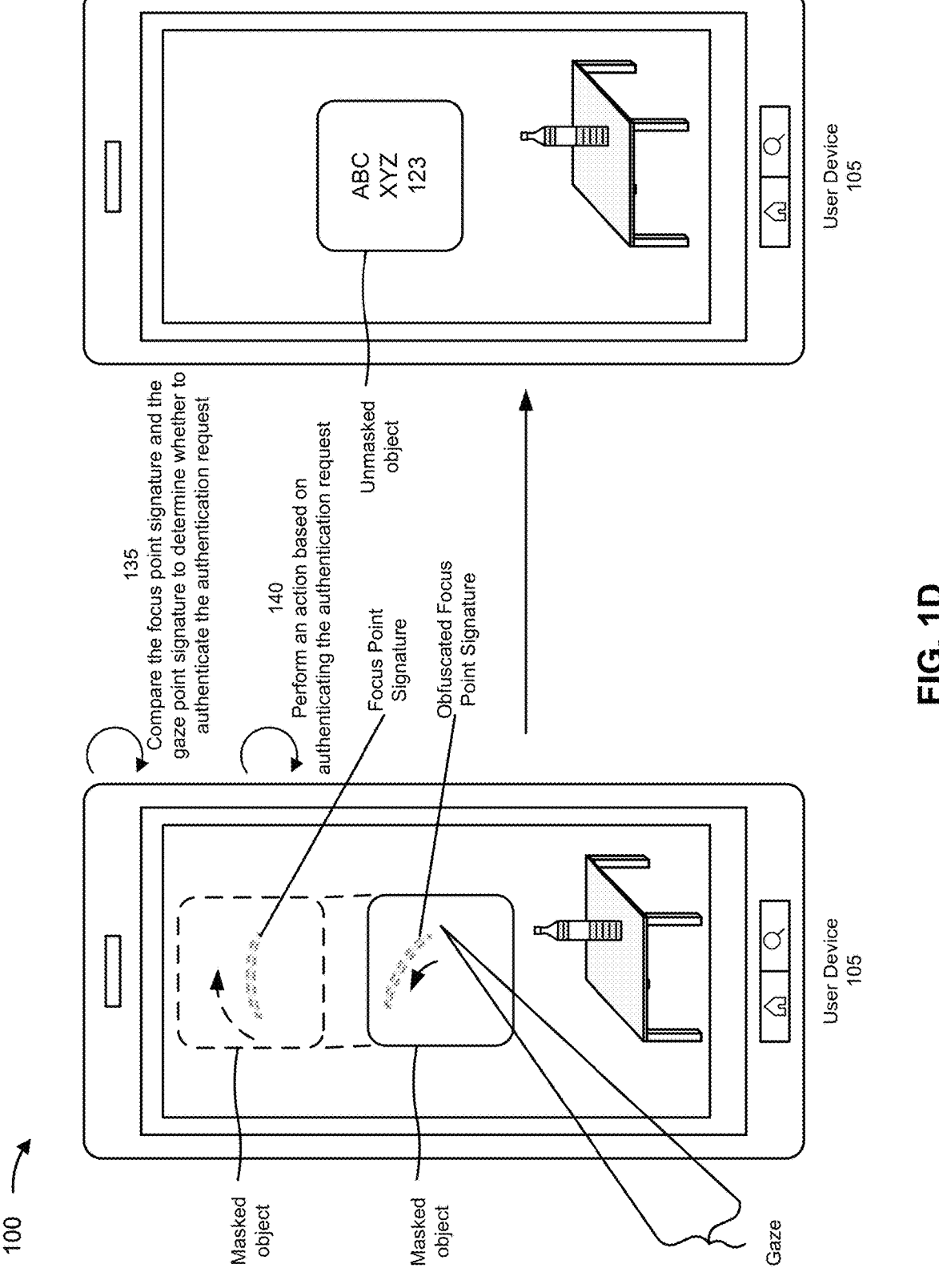

As shown by FIG. 1D, and by reference number 135, the user device 105 may compare the focus point signature and the gaze signature to determine whether to authenticate the authentication request. In some implementations, the user device 105 may compare the focus point signature and the gaze signature to determine whether a measure of similarity between the focus point signature and the gaze signature satisfies a threshold. For example, the user device 105 may compare the motion pattern associated with the focus point signature and the motion pattern associated with the gaze signature to determine whether a quantity of matching motions (motions between the motion pattern of the gaze signature and the motion pattern of the focus point signature that match) satisfy a threshold quantity of matching motions.

For example, if the motion pattern associated with the gaze signature is visually depicted as a first gaze position (e.g., (0,0) in a 2D coordinate system) being connected, via a line, to a second gaze position (e.g., 0,1 in the 2D coordinate system), and if the motion pattern associated with the focus point signature is visually depicted as a first focus point position being connected, via a line, to a second focus point position (0,1), then the user device 105 may determine that the quantity of matching motions is one. The user device 105 may authenticate the authentication request based on determining that the quantity of matching motions satisfies the threshold quantity of matching motions. In some implementations, the authentication request may be associated with the user device 105 performing an action based on authenticating the authentication request, as described in more detail elsewhere herein.

As further shown in FIG. 1D, and by reference number 140, the user device 105 may perform an action based on authenticating the authentication request. For example, the action (e.g., performed by the user device 105) may be a revealing action (e.g., an unmasking action) that reveals (e.g., that unmasks) at least a portion of the visual depiction of the real-world object (e.g., at least a portion of a visual depiction of a 3D real-world object) that is displayed via the interface of the device. As another example, the action (e.g., performed by the user device 105) may be a concealing action (e.g., a masking action) that conceals (e.g., that masks) at least a portion of a visual depiction of a real-world object (e.g., a visual depiction of a 3D real-world object) that is displayed via the interface of the device.

In some implementations, the user device 105 may perform the concealing action to conceal information associated with the visual depiction of the real-world object and/or may perform the revealing action to reveal information associated with the visual depiction of the real-world object. As an example, if the visual depiction of the real-world object depicts a surface of the real-world object that displays information (e.g., sensitive information and/or any other suitable information) via the user interface, then the user device 105 may perform the concealing action to conceal at least a portion of the surface of the real-world object that displays the information via the user interface (e.g., to conceal the sensitive information and/or any other suitable information).

As another example, and as shown in FIG. 1D, if the visual depiction of the real-world object depicts a concealed surface of the real-world object (e.g., that the user knows is concealing sensitive information), then the user device 105 may perform the revealing action to reveal the surface of the real world object (e.g., to enable the sensitive information to be displayed). Although the user device 105 is described as performing a concealing action and/or a revealing action (e.g., based on authenticating the authentication request), the user device 105 may perform any suitable action (e.g., based on authenticating the authentication request).

Furthermore, although the user device 105 is described as performing operations associated with capturing images and/or processing the images, in some other implementations, another device and/or other devices may use one or more techniques (e.g., one or more computer vision techniques) to obtain data associated with the user (e.g., data associated with the eyes of the user) and/or to process the data associated with the user (e.g., the data associated with the eyes of the user). As an example, an eye tracking device (e.g., that is separate from the user device 105) may use electrooculography techniques (e.g., which are associated with measuring electrical signals generated by eye movements of the user) and/or infrared techniques (e.g., which are associated with using infrared light to detect reflections from corneas and/or pupils of the eyes of the user), among other examples, to obtain the data associated with the gaze of the user and/or to process the data associated with the gaze of the user. As another example, a server device (e.g., associated with a third party that provides authentication services) may receive, and the user device 105 and/or another device, may provide, the data associated with the gaze of the user. The server device may process the data associated with the gaze of the user. The server device may authenticate the authentication request (e.g., based on processing the data associated with the gaze of the user).

In this way, some implementations described herein enable optical signature generation and authentication that provides enhanced security associated with performing an authentication procedure, such as an authentication procedure associated with authenticating a user attempting to gain access to the user device 105. For example, because the user device 105 displays the obfuscated gaze signature and/or the obfuscated focus point signature via the user interface of the user device 105, a malicious actor that views the user interface is unable to determine a motion pattern associated with the gaze signature and/or the motion pattern associated with the focus point signature (e.g., which are used for authenticating the user). Additionally, sensitive information may remain secure even if surrounding persons can view the user interface of the user device 105 (e.g., because the user can cause the user device 105 to conceal the sensitive information based on the user input that is captured by the device).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
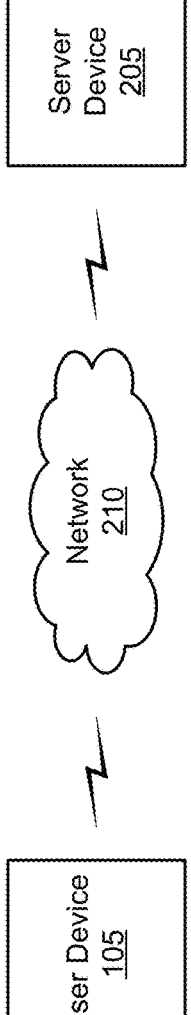
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 105, a server device 205, and a network 210. Devices of environment 200 may interconnect via wired connections, wireless connections, or a combination of wired and wireless connections.

The user device 105 may include one or more devices capable of receiving, storing, processing, and/or providing information associated with optical signature generation and authentication, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set top box, a wearable communication device (e.g., a smart wristwatch, a pair of smart eyeglasses, or a head mounted display), or a similar type of device.

The server device 205 may include one or more devices capable of receiving, generating, storing, processing, providing, and/or routing information associated with optical signature generation and authentication, as described elsewhere herein. The server device 205 may include a communication device and/or a computing device. For example, the server device 205 may include a server, such as an application server, a client server, a web server, a database server, a host server, a proxy server, a virtual server (e.g., executing on computing hardware), or a server in a cloud computing system. In some implementations, the server device 205 may include computing hardware used in a cloud computing environment.

The network 210 may include one or more wired and/or wireless networks. For example, the network 210 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
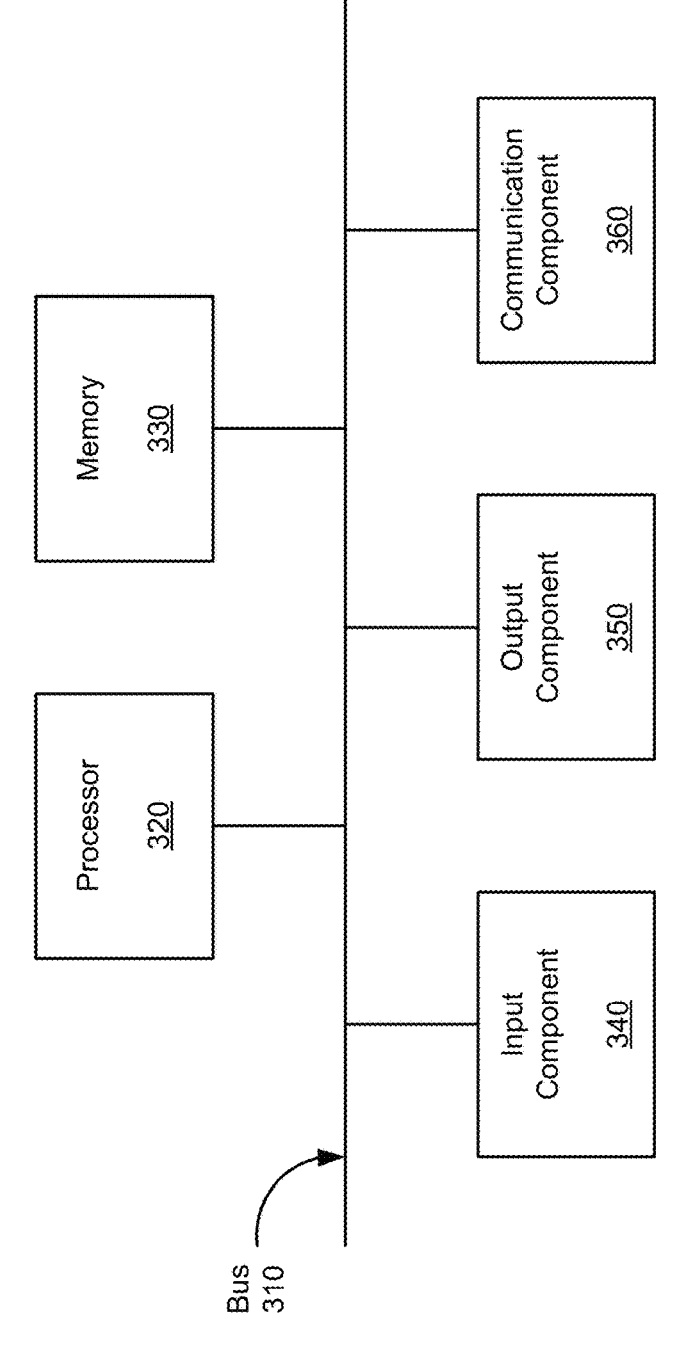
FIG. 3 is a diagram of example components of a device associated with optical signature generation and authentication.

FIG. 3 is a diagram of example components of a device 300 associated with optical signature generation and authentication. The device 300 may correspond to the user device 105 and/or the server device 205. In some implementations, the user device 105 and/or the server device 205 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with optical signature generation and authentication. In some implementations, one or more process blocks of FIG. 4 may be performed by a device (e.g., the user device 105). In some implementations, one or more process blocks of FIG. 4 may be performed by another device or a group of devices separate from or including the device, such as a server device (e.g., the server device 205). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include tracking a gaze of a user (block 410). For example, the device may track a gaze of a user, as described above.

As further shown in FIG. 4, process 400 may include detecting a direction of the gaze of the user (block 420). For example, the device may detect a direction of the gaze of the user, as described above.

As further shown in FIG. 4, process 400 may include detecting eye movement data associated with one or more changes in the direction of the gaze of the user (block 430). For example, the device may detect eye movement data associated with one or more changes in the direction of the gaze of the user, as described above.

As further shown in FIG. 4, process 400 may include translating the eye movement data associated with the one or more changes in the direction of the gaze of the user into a gaze signature (block 440). For example, the device may translate the eye movement data associated with the one or more changes in the direction of the gaze of the user into a gaze signature, as described above. In some implementations, the gaze signature may include a reference points (e.g., a set of reference points) corresponding to positions of the direction of the gaze of the user in a coordinate system associated with an interface of the device As an example, the reference points corresponding to the positions of the direction of the gaze of the user in the coordinate system associated with the interface of the device may be at least one of 2D anchor points and/or 3D anchor points. The process 400 may include displaying information that indicates the gaze signature via the interface of the device.

In some implementations, process 400 may include obfuscating the gaze signature to generate an obfuscated gaze signature. As an example, the obfuscated gaze signature may alter the reference points corresponding to the positions of the direction of the gaze of the user in the coordinate system associated with the interface of the device. The device may display information that indicates the obfuscated gaze signature via the interface of the device.

As further shown in FIG. 4, process 400 may include registering the gaze signature as an authentication credential associated with the user (block 450). For example, the device may register the gaze signature as an authentication credential associated with the user, as described above.

In some implementations, process 400 may include detecting a trigger event associated with an authentication request. For example, the device may detect, based on detecting the trigger event, a focus point of the gaze of the user in the coordinate system associated with the interface of the device. Process 400 may include detecting eye movement data associated with one or more changes in the focus point of the gaze of the user. Process 400 may include translating the eye movement data associated with the one or more changes in the focus point of the gaze of the user into a focus point signature. As an example, the focus point signature may include reference focus points (e.g., a set of reference focus points) corresponding to positions of the direction of the focus point of the gaze of the user in the coordinate system associated with the interface of the device. Process 400 may include comparing the focus point signature and the gaze signature to determine whether a measure of similarity between the focus point signature and the gaze signature satisfies a threshold.

In some implementations, registering, by the device, the gaze signature as the authentication credential associated with the user may include identifying an initial reference point, included in the reference points, which corresponds to an initial position of the direction of the gaze of the user in the coordinate system associated with the user interface of the device. The device may register, beginning with the initial reference point, the reference points corresponding to the positions of the direction of the gaze of the user in the coordinate system associated with the interface of the device.

In some implementations, process 400 may include authenticating the authentication request based on determining that the measure of similarity between the focus point signature and the gaze signature satisfies the threshold. Process 400 may include performing an action based on authenticating the authentication request. In some implementations, the action may include at least one of a masking action that masks a visual depiction of a real-world object that is displayed via the interface of the device, or an unmasking action that unmasks the visual depiction of the real-world object that is displayed via the interface of the device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

tracking, by a device, a gaze of a user;

detecting, by the device, a direction of the gaze of the user;

detecting, by the device, eye movement data associated with one or more changes in the direction of the gaze of the user;

translating, by the device, the eye movement data associated with the one or more changes in the direction of the gaze of the user into a gaze signature, wherein the gaze signature includes a set of reference points corresponding to positions of the direction of the gaze of the user in a coordinate system associated with an interface of the device, and wherein the gaze signature includes a visual depiction of the set of reference points being connected to one another;

registering, by the device, the gaze signature as an authentication credential associated with the user;

detecting, by the device, a focus point of the gaze of the user in the coordinate system associated with the interface of the device;

translating, by the device, eye movement data associated with one or more changes in the focus point of the gaze of the user into a focus point signature;

obfuscating, by the device, the focus point signature to generate an obfuscated focus point signature; and displaying, by the device, information that indicates the obfuscated focus point signature via the interface of the device.

2. The method of claim 1, further comprising:

displaying information that indicates the gaze signature via the interface of the device.

3. The method of claim 1, further comprising:

obfuscating the gaze signature to generate an obfuscated gaze signature, wherein the obfuscated gaze signature alters the set of reference points corresponding to the positions of the direction of the gaze of the user in the coordinate system associated with the interface of the device; and displaying information that indicates the obfuscated gaze signature via the interface of the device.

4. The method of claim 1, further comprising:

detecting a trigger event associated with an authentication request;

detecting, based on detecting the trigger event, the focus point of the gaze of the user;

detecting the eye movement data associated with one or more changes in the focus point of the gaze of the user;

comparing the focus point signature and the gaze signature to determine whether a measure of similarity between the focus point signature and the gaze signature satisfies a threshold;

authenticating the authentication request based on determining that the measure of similarity between the focus point signature and the gaze signature satisfies the threshold; and performing an action based on authenticating the authentication request.

5. The method of claim 4, wherein the action comprises at least one of:

a masking action that masks a visual depiction of a real-world object that is displayed via the interface of the device, or an unmasking action that unmasks the visual depiction of the real-world object that is displayed via the interface of the device.

6. The method of claim 1, wherein the set of reference points corresponding to the positions of the direction of the gaze of the user in the coordinate system associated with the interface of the device is at least one of:

a set of two-dimensional anchor points, or a set of three-dimensional anchor points.

7. The method of claim 1, wherein registering, by the device, the gaze signature as the authentication credential associated with the user comprises:

identifying an initial reference point, of the set of reference points, corresponding to an initial position of the direction of the gaze of the user in the coordinate system associated with the interface of the device; and registering, beginning with the initial reference point, the set of reference points corresponding to the positions of the direction of the gaze of the user in the coordinate system associated with the interface of the device.

8. A device, comprising:
one or more processors configured to:
  track a gaze of a user;
  detect a direction of the gaze of the user;
  detect eye movement data associated with one or more changes in the direction of the gaze of the user;
  translate the eye movement data associated with the one or more changes in the direction of the gaze of the user into a gaze signature,
    wherein the gaze signature includes a set of reference points corresponding to positions of the direction of the gaze of the user in a coordinate system associated with an interface of the device, and
    wherein the gaze signature includes a visual depiction of the set of reference points being connected to one another;
  register the gaze signature as an authentication credential associated with the user;
  obfuscate the gaze signature to generate an obfuscated gaze signature,
    wherein the obfuscated gaze signature alters the set of reference points corresponding to the positions of the direction of the gaze of the user in the coordinate system associated with the interface of the device;
  display information that indicates the obfuscated gaze signature via the interface of the device,
    wherein the information visually depicts a motion pattern associated with the gaze signature based on the set of reference points;
  detect a focus point of the gaze of the user in the coordinate system associated with the interface of the device based on authentication request;
  translate eye movement data associated with one or more changes in the focus point of the gaze of the user into a focus point signature;
  compare the focus point signature and the gaze signature to determine whether a measure of similarity between the focus point signature and the gaze signature satisfies a threshold; and
  authenticate the authentication request based on satisfying the threshold.

9. The device of claim 8,
wherein the one or more processors are further configured to:
  detect a trigger event associated with the authentication request;
  detect based on detecting the trigger event, the focus point of the gaze of the user in the coordinate system associated with the interface of the device;
  detect the eye movement data associated with one or more changes in the focus point of the gaze of the user;
and perform an action based on authenticating the authentication request.

10. The device of claim 9,
wherein the action comprises at least one of:
  a masking action that masks a visual depiction of a real-world object that is displayed via the interface of the device, or an unmasking action that unmasks the visual depiction of the real-world object that is displayed via the interface of the device.

11. The device of claim 8,
wherein the set of reference points corresponding to the positions of the direction of the gaze of the user in the coordinate system associated with the interface of the device is at least one of:
  a set of two-dimensional anchor points, or
  a set of three-dimensional anchor points.

12. The device of claim 8,
wherein the one or more processors, to register the gaze signature as an authentication credential associated with the user, are configured to:
  identify an initial reference point, of the set of reference points, corresponding to an initial position of the direction of the gaze of the user in the coordinate system associated with the interface of the device; and
  register, beginning with the initial reference point, the set of reference points corresponding to the positions of the direction of the gaze of the user in the coordinate system associated with the interface of the device.

13. A non-transitory computer-readable medium storing a set of instructions, the set of instructions comprising:
  one or more instructions that, when executed by one or more processors of a device, cause the device to:
  track a gaze of a user;
  detect a direction of the gaze of the user;
  detect eye movement data associated with one or more changes in the direction of the gaze of the user;
  translate the eye movement data associated with the one or more changes in the direction of the gaze of the user into a gaze signature,
    wherein the gaze signature includes a set of reference points corresponding to positions of the direction of the gaze of the user in a coordinate system associated with an interface of the device, and
    wherein the gaze signature includes a visual depiction of the set of reference points being connected to one another;
  register the gaze signature as an authentication credential associated with the user;
  obfuscate the gaze signature to generate an obfuscated gaze signature,
    wherein the obfuscated gaze signature alters the set of reference points corresponding to the positions of the direction of the gaze of the user in the coordinate system associated with the interface of the device;
  display information that indicates the obfuscated gaze signature via the interface of the device,
    wherein the information visually depicts a motion pattern associated with the gaze signature based on the set of reference points;
  detect a focus point of the gaze of the user in the coordinate system associated with the interface of the device;
  translate eye movement data associated with one or more changes in the focus point of the gaze of the user into a focus point signature; and
  compare the focus point signature and the gaze signature to determine whether a measure of similarity between the focus point signature and the gaze signature satisfies a threshold.

14. The non-transitory computer-readable medium of claim 13, wherein the one or more instructions that further cause the device to:

detect a trigger event associated with an authentication request;

detect based on detecting the trigger event, a focus point of the gaze of the user in the coordinate system associated with the interface of the device;

detect the eye movement data associated with one or more changes in the focus point of the gaze of the user;

authenticate the authentication request based on determining that the measure of similarity between the focus point signature and the gaze signature satisfies the threshold; and perform an action based on authenticating the authentication request.

15. The non-transitory computer-readable medium of claim 14, wherein the action comprises at least one of:

a masking action that masks a visual depiction of a real-world object that is displayed via the interface of the device, or an unmasking action that unmasks the visual depiction of the real-world object that is displayed via the interface of the device.

16. The non-transitory computer-readable medium of claim 13, wherein the set of reference points that correspond to the positions of the direction of the gaze of the user in the coordinate system associated with the interface of the device is at least one of:

a set of two-dimensional anchor points, or a set of three-dimensional anchor points.

17. The device of claim 8, wherein the one or more processors are further configured to:

obfuscate the focus point signature to generate an obfuscated focus point signature, wherein the obfuscated focus point signature alters the set of reference points using one or more offset values or angle rotation values; and display information that indicates the obfuscated focus point signature via the interface of the device.

18. The non-transitory computer-readable medium of claim 13, wherein the one or more one or more instructions that further cause the device to:

obfuscate the focus point signature to generate an obfuscated focus point signature, wherein the obfuscated focus point signature alters the set of reference points using one or more offset values or angle rotation values; and display information that indicates the obfuscated focus point signature via the interface of the device.

19. The device of claim 8, wherein the one or more processors to register the gaze signature as the authentication credential is to:

register multiple gaze signatures associated with multiple different shapes, wherein the gaze signature is one of the multiple gaze signatures.

20. The non-transitory computer-readable medium of claim 13, wherein the one or more one or more instructions that, cause the device to register the gaze signature as the authentication credential, cause the device to:

register multiple gaze signatures associated with multiple different shapes, wherein the gaze signature is one of the multiple gaze signatures.

\*    \*    \*    \*    \*